United States Patent
Liu et al.

(10) Patent No.: US 10,912,011 B2
(45) Date of Patent: Feb. 2, 2021

(54) METHOD, BASE STATION AND USER EQUIPMENT FOR TRANSCEIVING SYSTEM INFORMATION

(71) Applicant: Telefonaktiebolaget LM Ericsson (publ), Stockholm (SE)

(72) Inventors: Jinhua Liu, Beijing (CN); Rui Fan, Beijing (CN); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 15/568,436

(22) PCT Filed: Sep. 27, 2017

(86) PCT No.: PCT/CN2017/103684
§ 371 (c)(1),
(2) Date: Oct. 20, 2017

(87) PCT Pub. No.: WO2018/126744
PCT Pub. Date: Jul. 12, 2018

(65) Prior Publication Data
US 2018/0302844 A1    Oct. 18, 2018

(30) Foreign Application Priority Data

Jan. 4, 2017   (WO) ................ PCT/CN2017/070129

(51) Int. Cl.
*H04L 12/28*      (2006.01)
*H04W 48/10*     (2009.01)
(Continued)

(52) U.S. Cl.
CPC ........... *H04W 48/10* (2013.01); *H04W 48/12* (2013.01); *H04W 48/16* (2013.01)

(58) Field of Classification Search
CPC ...... H04W 48/10; H04W 48/12; H04W 48/16
See application file for complete search history.

(56) References Cited

U.S. PATENT DOCUMENTS

| | | | |
|---|---|---|---|
| 2009/0316603 A1 | 12/2009 | Amerga et al. | |
| 2010/0110747 A1* | 5/2010 | Nakaoka | G11C 11/4076 365/51 |

(Continued)

FOREIGN PATENT DOCUMENTS

| | | |
|---|---|---|
| CN | 101227706 A | 7/2008 |
| CN | 101895961 A | 11/2010 |

(Continued)

OTHER PUBLICATIONS

Interdigital communication (R2-166868, Oct. 10-14, 2016, structure and contents of system information for NR meeting #95, Kaohsiung, Taiwan) (Year: 2016).*

(Continued)

*Primary Examiner* — Maharishi V Khirodhar
(74) *Attorney, Agent, or Firm* — NDWE LLP

(57) ABSTRACT

Method, base station and user equipment for transceiving system information (SI). A minimum SI message is transmitted, in which the minimum SI message comprises information regarding transmission of at least one additional SI message. The at least one additional SI message is transmitted according to the information in the minimum SI message. The minimum SI message comprises an indicator for indicating the transmission of the at least one additional SI message. The indicator further indicates that the at least one additional SI message are periodically broadcasted.

18 Claims, 8 Drawing Sheets

(51) Int. Cl.
   *H04W 48/16*   (2009.01)
   *H04W 48/12*   (2009.01)

(56) References Cited

U.S. PATENT DOCUMENTS

| | | | | |
|---|---|---|---|---|
| 2010/0110947 | A1* | 5/2010 | Kitazoe | H04L 5/0053 370/310 |
| 2012/0064890 | A1 | 3/2012 | Hwang et al. | |
| 2014/0334372 | A1* | 11/2014 | Vos | H04W 48/10 370/312 |
| 2016/0286555 | A1* | 9/2016 | Papasakellariou | H04L 5/0053 |
| 2017/0251500 | A1* | 8/2017 | Agiwal | H04W 48/12 |
| 2017/0367008 | A1* | 12/2017 | Takahashi | H04W 48/16 |
| 2020/0087704 | A1* | 3/2020 | Annunziata | C12Q 1/34 |

FOREIGN PATENT DOCUMENTS

| | | |
|---|---|---|
| CN | 103220652 A | 7/2013 |
| JP | 2009-260749 A | 11/2009 |
| WO | 2015037168 A1 | 3/2015 |
| WO | 2016/163356 A1 | 10/2016 |

OTHER PUBLICATIONS

Huawei (R2-167580, Nov. 14-18, 2016, further considerations of "other SI", Reno Nevada, meeting #96) (Year: 2016).*
Huawei (R2-166203, delivery of "Other SI" in NR, Oct. 10-14, 2016, Meeting95, Kaohsiung) (Year: 2016).*
CMCC (R2-167074, Oct. 10-14, 2016, Meeting 95bis, "Further considerations on minimum SI"). (Year: 2016).*
Samsung (R2-168152, Contents of minimum system information, Nov. 14-18, 2016, meeting #96, Reno Nevada) (Year: 2016).*
Huawei (R2-166202, Nov. 14-18, 2016, further discussion of "Minimum SI" Kaohsiung, meeting #95) (Year: 2016).*
Huawei (R2-167,579, Reno, Nevada, Nov. 14-18, 2016, further considerations on "Minimum SI") (Year: 2016).*
ZTE, ZTE Microelectronics, Consideration on the Minimum SI in NR,R2-168472,Reno, USA, Nov. 14-18, 2016 (Year: 2016).*
Huawei, HiSilicon,Further Considerations of "Other SI",R2-167580,Reno, Nevada, USA, Nov. 14-18, 2016 (Year: 2016).*
Huawei, HiSilicon "Further Considerations of "Other SI"," Nov. 14-18, 2016, 3GPP TSG-RAN2 Meeting #96, R2-167580, 6 pages.
Huawei, HiSilicon "Further Discussions of "Minimum SI"," Oct. 10-14, 2016, 3GPP TSG-RAN2 Meeting #95bis, R2-166202, 3 pages.
International Search Report and Written Opinion for Application No. PCT/CN2017/103684, dated Dec. 19, 2017, 12 pages.
Extended European Search report for Application No. 17784156.6, dated Nov. 21, 2018, 9 pages.
InterDigital Communications, "Structure and Contents of System Information for NR," 3GPP TSG-RAN WG2 #95-BIS, R2-166868, Oct. 10-14, 2016, retrieved from http://www.3gpp.org/ftp/Meetings_3GPPSYNC/RAN2/Docs/ on Oct. 9, 2016, 3 pages.
International Preliminary Report on Patentability received for PCT Patent Application No. PCT/CN2017/103684, dated Jul. 18, 2019, 7 pages.
Preliminary Search Report and Search Opinion received for Moroccan Patent Application No. 461450, completed on Oct. 2, 2019, 4 pages of Original Document Only.
Communication under Rule 71(3) EPC, EP App. No. 17784156.6, dated Dec. 6, 2019, 88 pages.
Decision to Grant a European Patent pursuant to Article 97(1) EPC, EP App. No. 17784156.6, dated Feb. 6, 2020, 2 pages.
European Search Report and Search Opinion, EP App. No. 20153341.1, dated Jun. 8, 2020, 9 pages.
First Office Action, CN App. No. 201780001631.7, dated May 8, 2020, 18 pages (9 pages of English Translation and 9 pages of Original Document).
Office Action, IN App. No. 201717037074, dated Apr. 21, 2020, 5 pages.
Office Action, KR App. No. 10-2019-7018604, dated May 31, 2020, 13 pages (6 pages of English Translation and 7 pages of Original Document).
Office Action, JP App. No. 2019-536092, dated Aug. 25, 2020, 6 pages (3 pages of English Translation and 3 pages of Original Document).
Grant, CN App. No. 201780001631.7, dated Oct. 12, 2020, 3 pages (2 page of English Translation and 1 page of Original Document).
Grant, KR App. No. 10-2019-7018604, Nov. 10, 2020, 2 pages. (1 page of English Translation and 1 page of Original Document).
Communication under Rule 71(3) EPC for EP Application No. 20153341.1, dated Nov. 27, 2020, 84 pages.

* cited by examiner

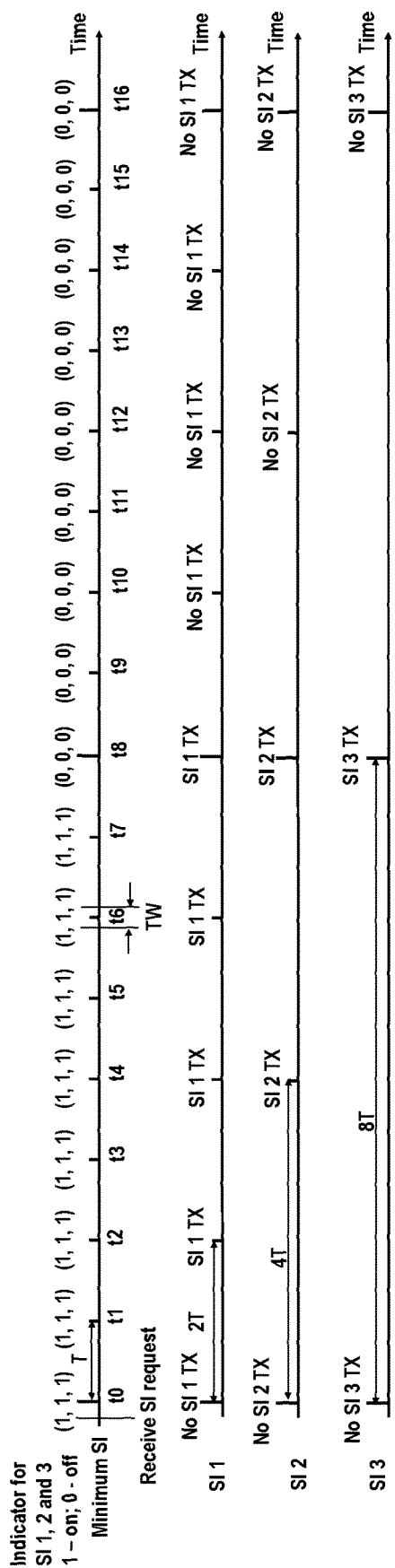
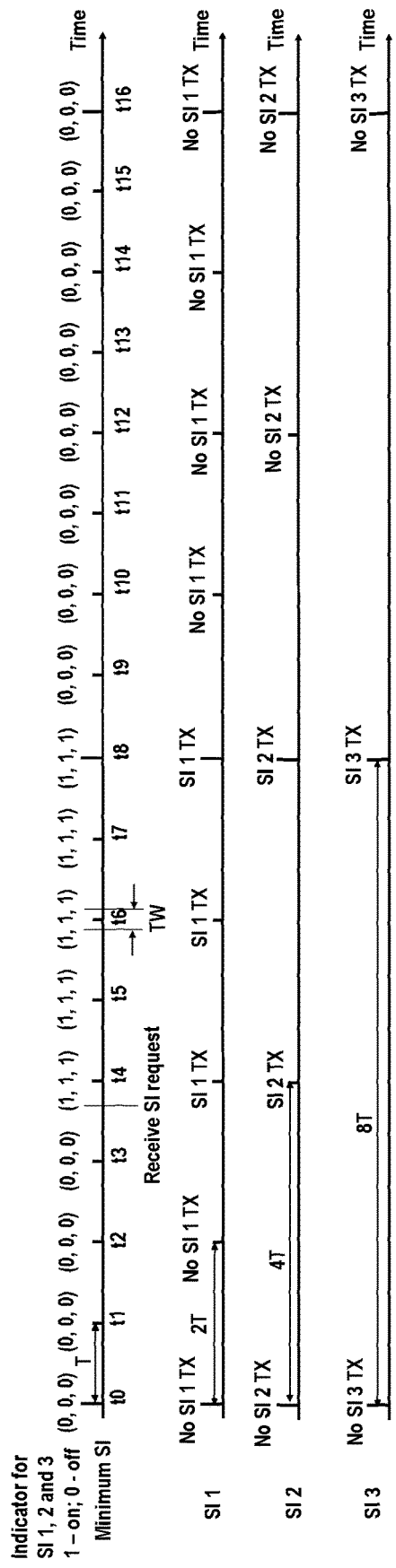
FIG. 1A
FIG. 1B

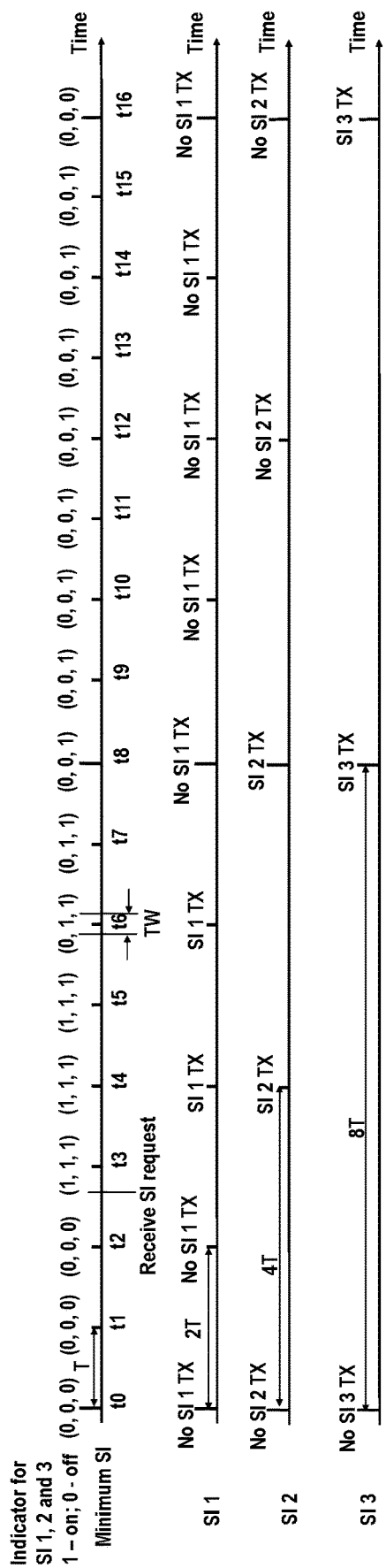
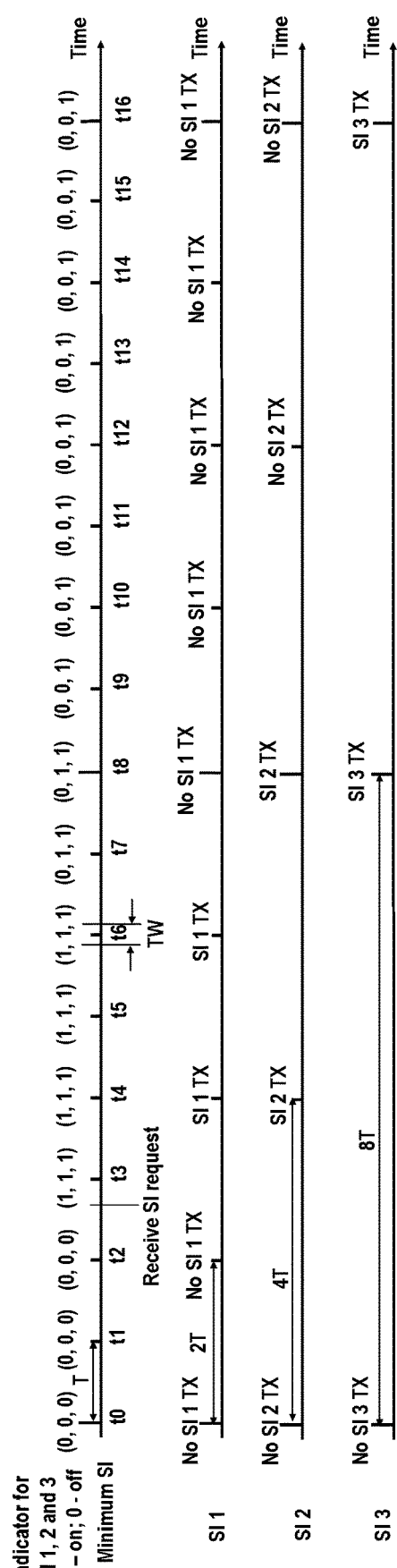
FIG. 2A
FIG. 2B

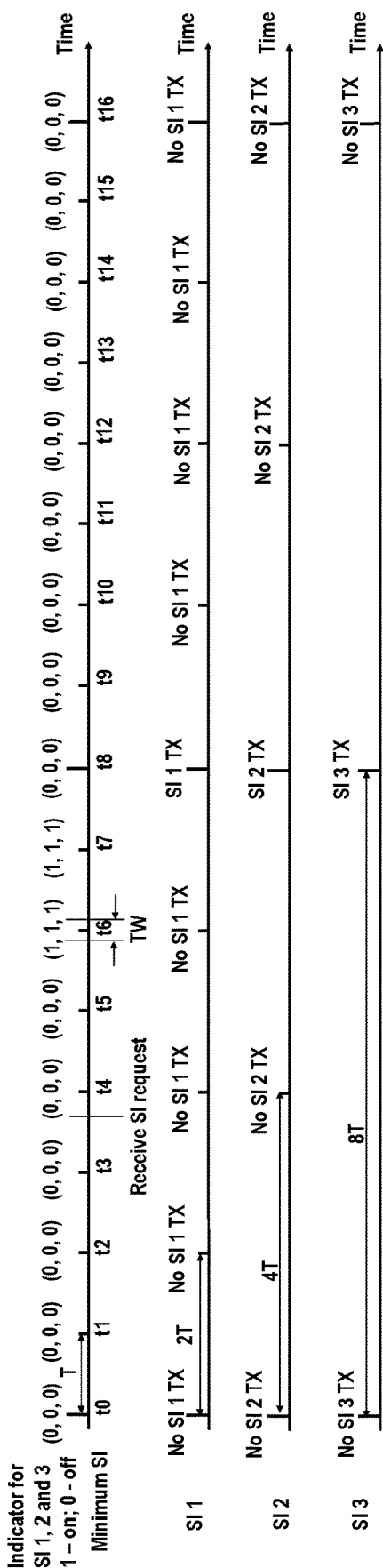
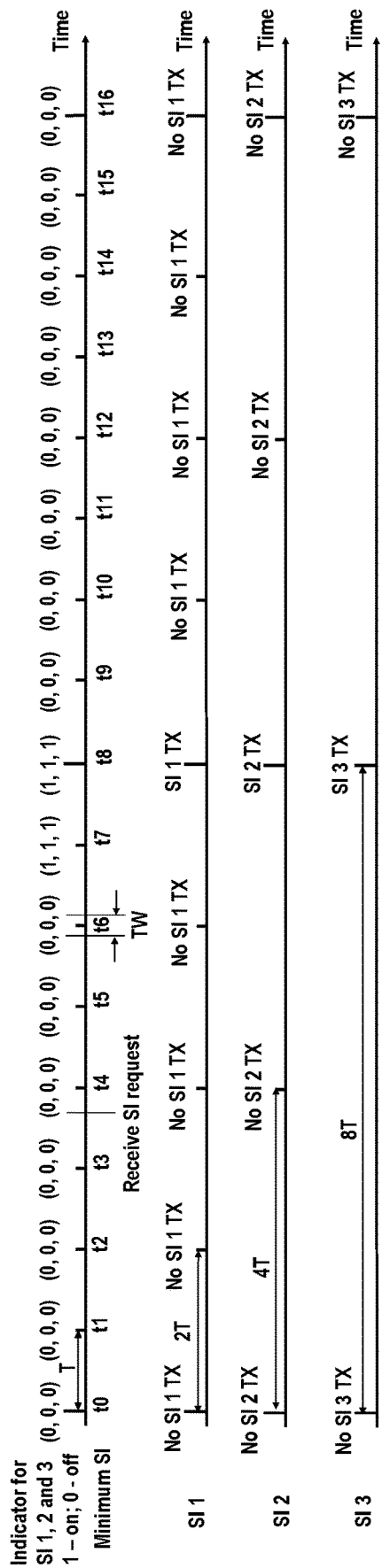
FIG. 3A
FIG. 3B

METHOD, BASE STATION AND USER EQUIPMENT FOR TRANSCEIVING SYSTEM INFORMATION

CROSS-REFERENCE TO RELATED APPLICATIONS

This application is a National stage of International Application No. PCT/CN2017/103684, filed Sep. 27, 2017, which claims priority to International Application No. PCT/CN2017/070129, filed Jan. 4, 2017, which are hereby incorporated by reference.

TECHNICAL FIELD

Embodiments of the disclosure generally relate to wireless communication, and, more particularly, to method, base station and user equipment for transceiving system information.

BACKGROUND

In a wireless communication network such as a long term evolution (LTE) network, system information (SI) is public information about how a user equipment (UE) communicates with a cell, such as transmission bandwidth, channel configurations, cell loading and power control parameters, for example. In LTE standards, SI is structured by means of system information blocks (SIBs), each of which contains a set of functionally-related parameters. The SIB types that have been defined include master information block (MIB) and system information block types 1-13 (SIB1-SIB13).

The MIB includes a limited number of the most frequently transmitted parameters which are essential for a UE's initial access to the network. SIB1 contains parameters needed to determine if a cell is suitable for cell selection, as well as information about the time domain scheduling of the other SIBs. SIB2 includes common and shared channel information. SIB3-SIB8 include parameters used to control intra-frequency, inter-frequency and inter-radio access technology (RAT) cell reselection. SIB9 is used to signal the name of a home evolved Node B (HeNB). SIB10-SIB12 include earthquake and tsunami warning service (ETWS) notifications and commercial mobile alert system (CMAS) warning messages. SIB13 includes multimedia broadcast multicast service (MBMS) related control information. More SIBs have been introduced in recent LTE releases.

Some agreements have been reached regarding SIs in 5G new radio (NR) system in Third Generation Partnership Project (3GPP). There are some changes made in NR system compared to LTE. Therefore, it would be desirable to provide a solution for SI transmission and reception in NR system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for system information transmission and reception in NR system.

According to one aspect of the disclosure, it is provided a method for transmitting system information (SI). The method comprises transmitting a minimum SI message. The minimum SI message comprises information regarding transmission of at least one additional SI message. The method further comprises transmitting the at least one additional SI message according to the information in the minimum SI message. The minimum SI message comprises an indicator for indicating the transmission of the at least one additional SI message. The indicator further indicates that the at least one additional SI message are periodically broadcasted.

In an embodiment of the disclosure, a transmission period (TP) of the at least one additional SI message is an integer multiple of the TP of the minimum SI message.

In an embodiment of the disclosure, the indicator indicates the transmission of the at least one additional SI message by a first indication mode or a second indication mode. The first indication mode indicates the transmission of the at least one additional SI message in its transmission window (TW) which is subsequent to the current TW of the minimum SI message. The second indication mode indicates the transmission of the at least one additional SI message in its TW which is the same as the current TW of the minimum SI message.

In an embodiment of the disclosure, the indicator is set in response to a request from a user equipment (UE). Transmitting at least one additional SI message comprises transmitting at least two additional SI messages according to the respective TPs of the at least two additional SI messages until the additional SI message having the largest TP among the at least two additional SI messages is transmitted, such that the additional SI message having smaller TP is transmitted more than one times.

In an embodiment of the disclosure, the indicator is set in response to a request from a UE. Transmitting at least one additional SI message comprises transmitting each of the at least one additional SI message for its predetermined times according to the TP of the each additional SI message.

In an embodiment of the disclosure, the indicator is set in response to a request from a UE. Transmitting at least one additional SI message comprises transmitting at least two additional SI messages only in an aligned TW between the at least two additional SI messages.

In an embodiment of the disclosure, the indicator is set in response to a request from a UE. Transmitting at least one additional SI message comprises transmitting at least two additional SI messages in a TW for the additional SI message having the smallest TP among the at least two additional SI messages.

In an embodiment of the disclosure, the indicator is set in response to a request from a UE. Transmitting at least one additional SI message comprises transmitting the at least one additional SI message in a TW of the minimum SI message.

In an embodiment of the disclosure, a redundancy version for a repeated SI message transmission is adjusted.

In an embodiment of the disclosure, the number of repetitions for each of the at least one additional SI message is determined based on one of, or combination of, the following: a coverage size of a cell; a received signal strength of the request from the UE; and an importance of the requested SI message.

In an embodiment of the disclosure, the indicator is set to ON until the transmission of the at least one additional SI message is finished. Alternatively, the indicator is set to ON only before the transmission of the at least one additional SI message.

In an embodiment of the disclosure, the indicator indicates the transmission for all of the at least one additional SI message as a whole. Alternatively, the indicator indicates the transmission for each of the at least one additional SI message respectively.

In an embodiment of the disclosure, the minimum SI message indicates whether a UE is allowed to send an SI request.

In an embodiment of the disclosure, the indicator in the minimum SI message has a predetermined value for informing a UE not to send an SI request.

According to another aspect of the disclosure, it is provided a method for receiving system information (SI). The method comprises receiving a minimum SI message from a base station (BS). The minimum SI message comprises information regarding transmission of at least one additional SI message. The method further comprises obtaining at least one additional SI message from the BS according to the information in the minimum SI message. The minimum SI message comprises an indicator for indicating the transmission of the at least one additional SI message. The indicator further indicates that the at least one additional SI message are periodically broadcasted.

In an embodiment of the disclosure, a transmission period (TP) of the at least one additional SI message is an integer multiple of the TP of the minimum SI message.

In an embodiment of the disclosure, obtaining at least one additional SI message comprises, for an additional SI message in the at least one additional SI message, determining whether the additional SI message is to be transmitted based on the indicator. Obtaining at least one additional SI message comprises, in response to a positive determination result, receiving the additional SI message according to the indicator. Obtaining at least one additional SI message comprises, in response to a negative determination result, transmitting a request for the additional SI message to the BS.

In an embodiment of the disclosure, obtaining at least one additional SI message comprises receiving at least two additional SI messages only in an aligned transmission window (TW) between the at least two additional SI messages.

In an embodiment of the disclosure, obtaining at least one additional SI message comprises receiving at least two additional SI messages in a TW for the additional SI message having the smallest TP among the at least two additional SI messages.

In an embodiment of the disclosure, obtaining at least one additional SI message comprises receiving the at least one additional SI message in the TW of the minimum SI message.

In an embodiment of the disclosure, the indicator indicates the transmission for all of the at least one additional SI message as a whole. Alternatively, the indicator indicates the transmission for each of the at least one additional SI message respectively.

According to another aspect of the disclosure, it is provided a base station (BS) capable of transmitting system information (SI). The BS comprises a processor and a memory. The memory contains instructions executable by the processor, whereby the BS is operative to transmit a minimum SI message. The minimum SI message comprises information regarding transmission of at least one additional SI message. The memory contains instructions executable by the processor, whereby the BS is further operative to transmit the at least one additional SI message according to the information in the minimum SI message. The minimum SI message comprises an indicator for indicating the transmission of the at least one additional SI message. The indicator further indicates that the at least one additional SI message are periodically broadcasted.

According to another aspect of the disclosure, it is provided a user equipment (UE) capable of receiving system information (SI). The UE comprises a processor and a memory. The memory contains instructions executable by the processor, whereby the UE is operative to receive a minimum SI message from a base station (BS). The minimum SI message comprises information regarding transmission of at least one additional SI message. The memory contains instructions executable by the processor, whereby the UE is further operative to obtain at least one additional SI message from the BS according to the information in the minimum SI message. The minimum SI message comprises an indicator for indicating the transmission of the at least one additional SI message. The indicator further indicates that the at least one additional SI message are periodically broadcasted.

According to another aspect of the disclosure, it is provided a computer program product. The computer program product comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

According to another aspect of the disclosure, it is provided a base station (BS) capable of transmitting system information (SI). The BS comprises a minimum SI message transmission module for transmitting a minimum SI message. The minimum SI message comprises information regarding transmission of at least one additional SI message. The BS further comprises an additional SI message transmission module for transmitting the at least one additional SI message according to the information in the minimum SI message. The minimum SI message comprises an indicator for indicating the transmission of the at least one additional SI message. The indicator further indicates that the at least one additional SI message are periodically broadcasted.

According to another aspect of the disclosure, it is provided a user equipment (UE) capable of receiving system information (SI). The UE comprises a reception module for receiving a minimum SI message from a base station (BS). The minimum SI message comprises information regarding transmission of at least one additional SI message. The UE further comprises an obtaining module for obtaining at least one additional SI message from the BS according to the information in the minimum SI message. The minimum SI message comprises an indicator for indicating the transmission of the at least one additional SI message. The indicator further indicates that the at least one additional SI message are periodically broadcasted.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIGS. 1A and 1B are diagrams illustrating a first scheme of the disclosure;

FIGS. 2A and 2B are diagrams illustrating a second scheme of the disclosure;

FIGS. 3A and 3B are diagrams illustrating a third scheme of the disclosure;

DETAILED DESCRIPTION

Figure 4A:
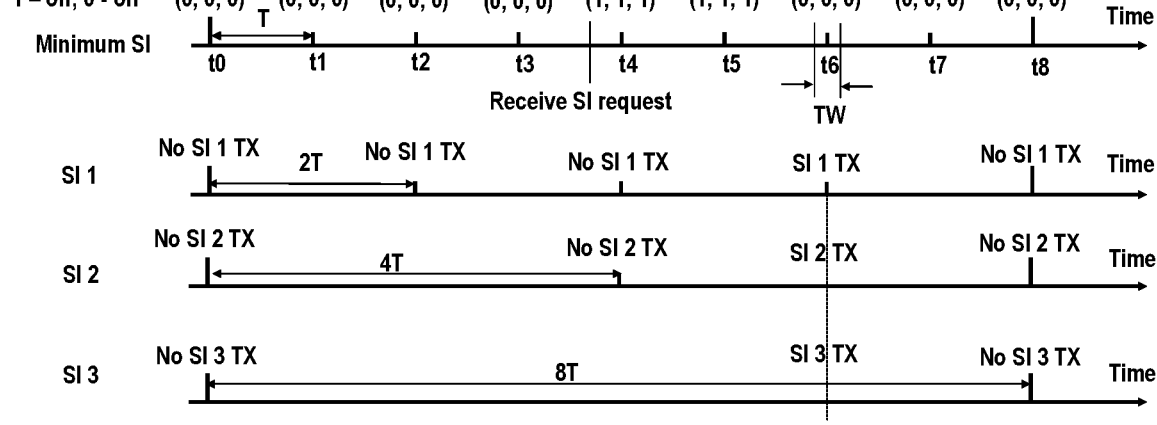
FIGS. 4A and 4B are diagrams illustrating a fourth scheme of the disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, system information (SI) in LTE is structured by means of SIBs. The SIB types that have been defined include MIB and SIB1-SIB13. Three types of radio resource control (RRC) messages are used to transfer system information. They are MIB message, SIB1 message and SI messages. There are several types of SI messages. Each type of SI message includes one or more SIBs which have the same scheduling requirements (e.g., the same transmission periodicity). The following Table 1 provides an example of a possible system information scheduling configuration. It also shows which SIBs a UE has to acquire in idle and connected states.

TABLE 1

Example of SI scheduling configuration

| Message | Content | Period (ms) | Applicability |
|---|---|---|---|
| MIB | Most essential parameters | 40 | Idle and connected |
| SIB1 | Cell access related parameters, scheduling information | 80 | Idle and connected |
| 1st SI | SIB2: Common and shared channel configuration | 160 | Idle and connected |
| 2nd SI | SIB3: Common cell reselection information and intra-frequency cell reselection parameters other than the neighboring cell information SIB4: Intra-frequency neighboring cell information | 320 | Idle only |
| 3rd SI | SIB5: Inter-frequency cell reselection information | 640 | Idle only |
| 4th SI | SIB6: UTRA cell reselection information SIB7: GERAN cell reselection information | 640 | Idle only, depending on UE support of UMTS or GERAN |

In 5G NR, system information is classified into minimum SI and other SIs. Minimum SI is the SI that UE must read before it can know how to access the network. Other SIs are those SIs that are not within minimum SI. Minimum SI will correspond to MIB, SIB1 and SIB2 in LTE. Other SIs will correspond to those remaining SIs.

According to some agreements that have been reached by the 3rd generation partnership project (3GPP) regarding NR system, the on-demand SI transmission will be introduced. Besides, the transmission of other SIs is indicated by the minimum SI, and the SI transmission window in LTE is baseline for NR. Since there may be multiple SIs and the transmission periodicities of different SIs may be different, it would be desirable to provide a mechanism for indicating the transmission of other SIs, a method for a base station (BS) to transmit the requested SIs, and a method for a UE to receive and request SIs.

The present disclosure proposes a series of schemes for SI transmission and reception. These schemes can be applied to a wireless communication system comprising a BS supporting communication related services in a coverage area (also referred to as a cell). The BS is also capable of communicating with at least one UE within the coverage area. The communications between the BS and the at least one UE may employ any wireless communication standards such as CDMA, TDMA, FDMA, OFDMA and so on. The BS may be, for example, a gNB in NR. The UE may be referred to as, for example, device, mobile station, mobile unit, subscriber station, wireless terminal, terminal, or the like. The UE may be mobile or stationary, and may be, for example, a wireless handheld device such as a wireless phone, a computer with a wireless connection to a network, a wireless plug-in accessory, or the like.

Hereinafter, some of the schemes will be described in detail with reference to FIGS. 1-5. For ease of description, as an exemplary example, it is assumed that there are four types of SIs, i.e., minimum SI, SI 1, SI 2 and SI 3. Each SI has a different transmission period (TP). Minimum SI's TP is T, SI 1's TP is 2T, SI 2's TP is 4T and SI 3's TP is 8T. In this example, the other SIs' TPs are power-of-two times of minimum SI's TP. However, those skilled in the art will understand that the principle of the present disclosure can work as long as the other SIs' TPs are integer times of minimum SI's TP. For ease of explanation, as a general example, it is also assumed that a UE requests a BS to transmit all of the three other SIs. Note that each of minimum SI, SI 1, SI 2 and SI 3 may be transmitted in any suitable message. Thus, the terms "minimum SI", "SI 1", "SI 2" and "SI 3" mentioned hereinafter may also represent their corresponding messages.

FIGS. 1A and 1B are diagrams illustrating a first scheme of the disclosure. As shown, for each of the other SIs, there is a corresponding bit in the indicator. The bit value 1 indicates that there is a transmission, while the bit value 0 indicates that there is no transmission. Thus, the indicator corresponds to the information regarding the transmission of at least one of the other SIs. The minimum SI's TP is T. That is, the transmission window (TW) for a minimum SI occurs every T. The TW for an SI refers to a time duration within which the SI is transmitted. For example, the first TW for minimum SI in FIG. 1A may be represented as [t0−TW/2, t0+TW/2]. Likewise, the first TW for SI 1 in FIG. 1A may be represented as [t2−TW/2, t2+TW/2], the first TW for SI 2 in FIG. 1A may be represented as [t4−TW/2, t4+TW/2], and the first TW for SI 3 in FIG. 1A may be represented as [t8−TW/2, t8+TW/2].

FIG. 1A illustrates the indication mode 1 for the first scheme. In the indication mode 1, the indicator of a minimum SI indicates the transmission of at least one other SI in its TW which is subsequent to the minimum SI's current TW. In other words, the indicator is not used to indicate the transmission of the other SIs in the same TW as the minimum SI. The indicator is used to indicate the transmission of the other SIs in the TW afterwards. Since the indicator indicates the transmission of the other SIs in a later TW, it is not mandatory to schedule the transmission of the other SIs after the transmission of minimum SI in a case where the minimum SI and the other SIs are in the same TW. In addition, in a case where there are multiple consecutive transmissions for a requested SI, the corresponding bit in the indicator is always set as ON during the time duration of the consecutive transmissions.

For example, as shown in FIG. 1A, the BS (e.g., gNB in NR) receives an SI request from the UE before the time t0. Then, for TW [t0−TW/2, t0+TW/2], the indicator is set to (1, 1, 1). This means that SI 1 is to be transmitted in TW [t2−TW/2, t2+TW/2] which is subsequent to the minimum SI's current TW [t0−TW/2, t0+TW/2]. Likewise, this also means that SI 2 is to be transmitted in TW [t4−TW/2, t4+TW/2], and SI 3 is to be transmitted in TW [t8−TW/2, t8+TW/2]. Accordingly, the BS will transmit SI 1 in TW [t2−TW/2, t2+TW/2], SI 2 in TW [t4−TW/2, t4+TW/2], and SI 3 in TW [t8−TW/2, t8+TW/2], so as to be consistent with the indicator. This may be implemented by, for example, a scheduler in the BS. In addition, because there will be no transmission of SI1, SI2 and SI3 respectively in SI 1's TW [t10−TW/2, t10+TW/2], SI 2's TW [t12−TW/2, t12+TW/2] and SI 3's TW [t16−TW/2, t16+TW/2], the indicator is set to (0, 0, 0) for TW [t8−TW/2, t8+TW/2].

FIG. 1B illustrates the indication mode 2 for the first scheme. In the indication mode 2, the indicator of a minimum SI can indicate the transmission of at least one other SI in its TW which is the same as the minimum SI's current TW. In other words, the indicator can be used to indicate the transmission of the other SIs in the same TW as the minimum SI. Since the indicator can indicate the transmission of the other SIs in the same TW, it is mandatory to schedule the transmission of minimum SI ahead of the transmission of the other SIs in a case where the minimum SI and the other SIs are in the same TW. Similar to the indication mode 1, in a case where there are multiple consecutive transmissions for a requested SI, the corresponding bit in the indicator is always set as ON during the time duration of the consecutive transmissions.

For example, as shown in FIG. 1B, the BS receives an SI request from the UE before the time t4. Then, for TW [t4−TW/2, t4+TW/2], the indicator is set to (1, 1, 1). This means that SI 1 is to be transmitted in TW [t4−TW/2, t4+TW/2] which is the same as the minimum SI's current TW, i.e., TW [t4−TW/2, t4+TW/2]. Likewise, this also means that SI 2 is to be transmitted in TW [t4−TW/2, t4+TW/2]. It should be noted that in the example of FIG. 1B, there is no SI 3's TW which is the same as the minimum SI's current TW. In this case, the bit value 1 corresponding to SI 3 indicates that SI 3 is to be transmitted in its subsequent TW, i.e., TW [t8−TW/2, t8+TW/2]. Accordingly, the BS will transmit SI 1 in TW [t4−TW/2, t4+TW/2], SI 2 in TW [t4−TW/2, t4+TW/2], and SI 3 in TW [t8−TW/2, t8+TW/2], so as to be consistent with the indicator. In addition, because there is a transmission in SI 1's TW [t8−TW/2, t8+TW/2], SI 2's TW [t8−TW/2, t8+TW/2] and SI 3's TW [t8−TW/2, t8+TW/2], the indicator is still set to (1, 1, 1) for TW [t8−TW/2, t8+TW/2]. Compared with FIG. 1A, it can be seen that the requested SI transmission according to the indication mode 2 can start in its first available TW which is immediately after reception of the SI request, while the SI transmission according to the indication mode 1 cannot achieve this in some situations.

However, the present disclosure is not limited to the above examples. As another example, the BS can set the indicator bit only before the transmission of a requested SI and reset the indicator bit in other conditions. This may result in that the UE must read the minimum SI multiple times before sending an SI request in a case where the UE desires multiple SIs with different TPs. This means a power consumption of the UE. As still another example, a single bit indicator is applied to indicate the transmission of all the other SIs. Thus, the indicator indicates the transmission for all of the other SIs as a whole. In this case, the indication mode 1 or 2 can also be applied.

As shown in FIGS. 1A-1B, in the first scheme, the BS starts the SI transmissions according to the order of the occurrences of the requested SIs. The requested SI with smaller TP (e.g., SI 1, SI 2) is transmitted more than one times until the last transmission of the requested SI with the largest TP (e.g., SI 3). For example, in FIG. 1A, until SI 3 is transmitted, SI 1 is transmitted four times, and SI 2 is transmitted two times. In FIG. 1B, until SI 3 is transmitted, SI 1 is transmitted three times, and SI 2 is transmitted twice. In this way, the reliability of the requested SIs with smaller TP can be enhanced since an SI with smaller TP is usually a more important SI for the UE.

From a UE's point of view, in the first scheme of FIGS. 1A and 1B, for the repeated transmissions of an SI with smaller TP, the UE may receive a repeated transmission if the first transmission for the SI is not received correctly, or the UE may ignore the repeated transmissions if the first transmission for the SI is received correctly.

FIGS. 2A and 2B are diagrams illustrating a second scheme of the disclosure. FIG. 2A corresponds to the indication mode 1, and FIG. 2B corresponds to the indication mode 2. In the second scheme, there are a number of repetitions for different requested SIs. The number of repetitions for a requested SI may be either predefined for both the BS and UE, or transparent to the UE. The number of repetitions may be either the same for all requested SIs or different for different SIs. The BS may determine the number of repetitions of a requested SI according to one or more of the following factors: the cell size, the received signal strength of the SI request signal, and the importance of the requested SI. For example, the BS may repeat a requested SI more times in a condition of a large cell coverage size, a weaker received signal strength of the SI request, or a more important SI. As a special example, the BS may just transmit a requested SI once. That is, the number of repetitions is configured to be zero.

For example, in the second scheme of FIGS. 2A-2B, the number of repetitions is one for each requested SI. That is, the number of transmissions is two for each requested SI. In FIG. 2A, the corresponding bits within the indicator are set with respect to the scheduled transmission of the requested SIs in the coming TWs. When the BS has finished the transmission of a requested SI, the BS sets the corresponding bit of the indicator to OFF. In FIG. 2B, the corresponding bits within the indicator are set with respect to the scheduled transmission of the request SIs in the same or coming TWs. It should be noted that the second scheme is also applicable to the special case where the number of the requested SIs is one.

Similar to the first scheme, in the second scheme, for the repeated transmissions of a requested SI, the UE may receive a repeated transmission if the first transmission for the requested SI is not received correctly, or the UE may ignore the repeated transmissions if the first transmission for the requested SI is received correctly.

FIGS. 3A and 3B are diagrams illustrating a third scheme of the disclosure. FIG. 3A corresponds to the indication mode 1, and FIG. 3B corresponds to the indication mode 2. In the third scheme, the BS waits for an aligned TW between all the requested SIs and send all the requested SIs in the same aligned TW. As shown, the BS does not send SI 1 and SI 2 immediately, but waits for an aligned TW for the three SIs and sends the three SIs only in the aligned TW. The indicator bits are set before and in the aligned TW. This scheme results in some delay to transmit some requested SIs of smaller TPs, but it can save some power for a UE to monitor different TWs for the receiving of different SIs.

Figure 4B:
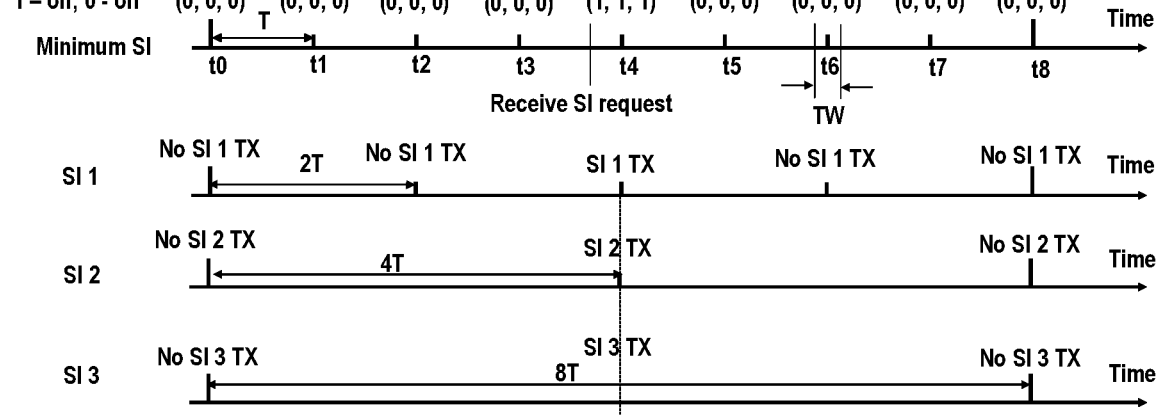

FIGS. 4A and 4B are diagrams illustrating a fourth scheme of the disclosure. FIG. 4A corresponds to the indication mode 1, and FIG. 4B corresponds to the indication mode 2. In the fourth scheme, in order to reduce the delay for acquiring the requested SIs, the BS sends all requested SIs in the TW for the requested SI having the smallest TP (e.g., SI 1). The UE monitors the requested SI accordingly. As shown, the corresponding indicator bits are set when the SI request is received until the transmission (or reception) of the requested SIs is finished. It should be noted that in this scheme, some SI having greater TP may not be transmitted according its TP. For example, in FIG. 4A, SI 2 and SI 3 are not transmitted according to their respective TPs. In FIG. 4B, SI 3 is not transmitted according to its TP.

Figure 5A:
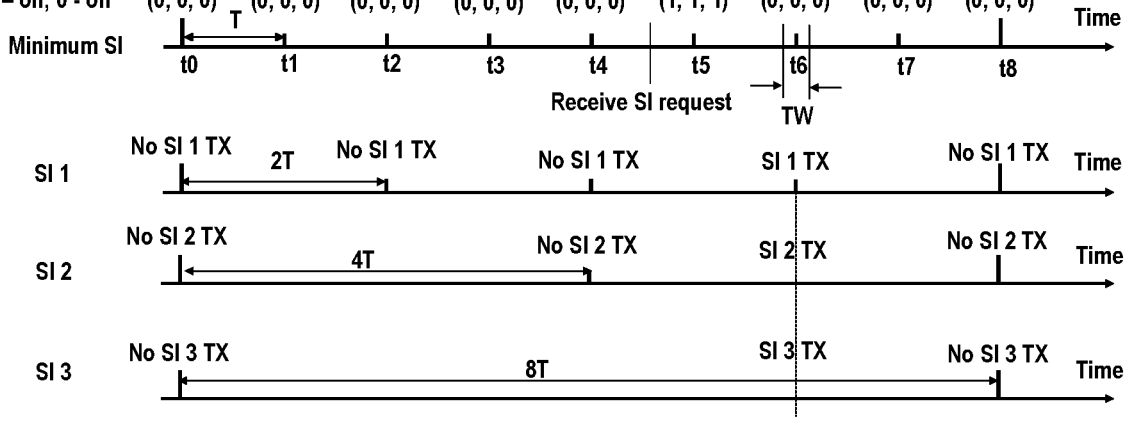
FIGS. 5A and 5B are diagrams illustrating a fifth scheme of the disclosure.
Figure 5B:
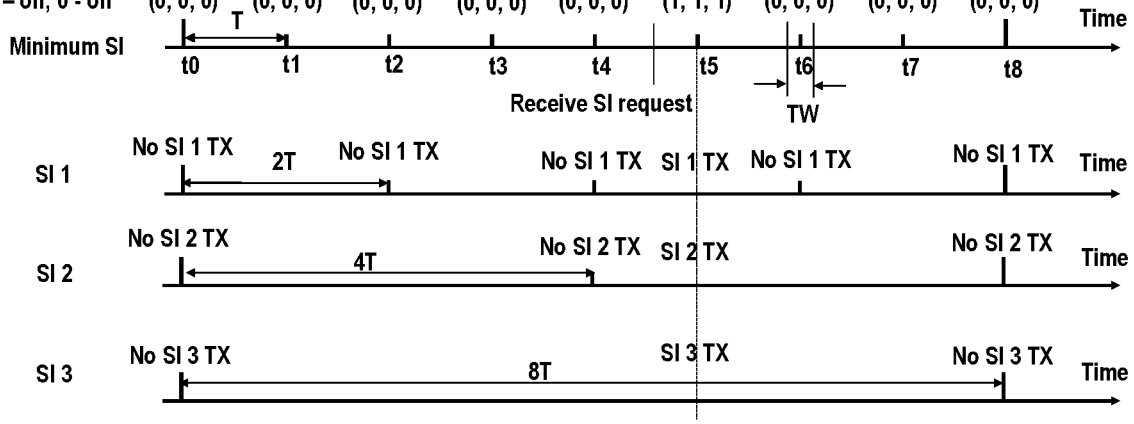

FIGS. 5A and 5B are diagrams illustrating a fifth scheme of the disclosure. FIG. 5A corresponds to the indication mode 1, and FIG. 5B corresponds to the indication mode 2. In the fifth scheme, in order to reduce the delay for acquiring the requested SIs, the BS sends all the requested SIs in the next TW for minimum SI. As shown, the corresponding indicator bits are set until the transmission (or repetition) of the requested SIs is finished. Similar to the fourth scheme, some SI having greater TP may not be transmitted according its TP. For example, in FIG. 5A, SI 2 and SI 3 are not transmitted according to their respective TPs. In FIG. 5B, SI 1, SI 2 and SI 3 are not transmitted according to their respective TPs. It should be also noted that the fifth scheme is also applicable to the special case where the number of the requested SIs is one.

In the schemes described above, the periodicity mismatch of different SIs and/or robustness of SI transmissions are considered. Thereby, the BS and UE behaviors can be aligned in the case of on-demand SI transmission.

It should be noted that the present disclosure is not limited to the above schemes. As a sixth scheme, there is no indicator setting for on-demand SI transmission. The BS (e.g., gNB) does not set the corresponding indicator bits of the requested SIs even after the SI requests are received. The indicator bits are only set when the BS performs regular periodical SI broadcast. In this case, after sending an SI request to the BS, the UE may blindly detect if there is an SI transmission.

As a seventh scheme, minimum SI contains no indicator for indicating the transmission of other SIs. In this case, the UE sends an SI request for its desired SI(s) to the BS. The BS transmits the requested SI(s) within a fixed time length after reception of the SI request. The UE blindly detects the requested SI(s) within the same fixed time length after sending the SI request. The fixed time length may be predefined between the BS and UE, and may be, for example, X transmission time intervals (TTIs) or other time units (e.g., slot, mini-slot, millisecond, and so on). In this way, the delay for on-demand SI transmission could be even smaller than the fourth, fifth and sixth schemes, at certain complexity increase for an additional timer for scheduling and SI monitoring in the BS and UE respectively.

As an eighth scheme, when there are repetitions for a requested SI, the redundancy version for the repeated SI transmission can be adjusted to enhance coding gain. This may be implemented by using soft combining technique for example. The eighth scheme may be applied to the first or second scheme. For example, in the first scheme of FIG. 1A, SI 1 is transmitted four times. The first transmission in TW [t2−TW/2, t2+TW/2] is a complete version of SI 1 which can be decoded independently. The subsequent transmissions in TW [t4−TW/2, t4+TW/2], TW [t6−TW/2, t6+TW/2] and TW [t8−TW/2, t8+TW/2] may be redundancy versions which are incomplete versions and may be different from each other. The first transmission and subsequent transmissions can be combined to enhance coding gain.

As a ninth scheme, when an idle UE desires an SI or multiple SIs, the idle UE firstly receives a minimum SI to determine whether or not the desired SI(s) will be transmitted, by detecting the indicator carried by the minimum SI. In a case where only one bit in the indicator is used for all other SIs, the UE determines whether or not it needs to send an SI request based on the ON/OFF state of this indicator bit. In a case where there is one indicator bit per other SI, the UE determines whether or not it needs to send an SI request according to the on/off state of the indictor bit(s) corresponding to its desired SI(s). The UE will send an SI request when the indicator bit for a desired SI is set to OFF.

As a tenth scheme, when there are too frequent SI requests for example, the network can disable on-demand SI transmissions and transmit all SIs regularly as LTE. For example, the system can perform SI transmissions according to pre-configured transmission windows, and the UE monitors the SIs accordingly. In this case, the network does not reserve radio resources for SI request transmission and a UE shall not transmit an SI request any more. The minimum SI can indicate whether a UE is allowed to send an SI request. As one example, the indicator of the minimum SI is set to a special value to inform a UE not to send an SI request. As another example, a bit is added in the minimum SI as enabler for on-demand SI requests.

Figure 6:
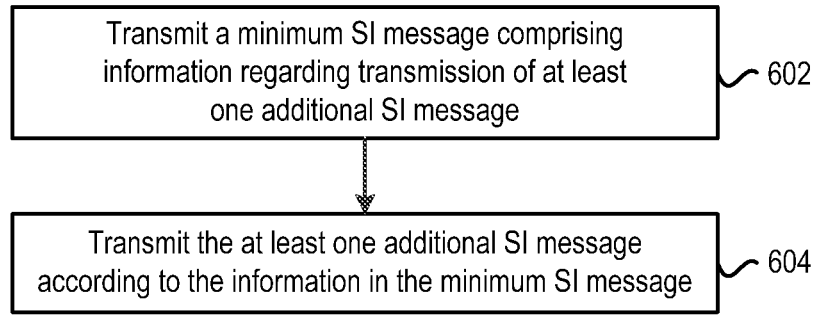
FIG. 6 is a flowchart illustrating a method for transmitting system information according to an embodiment of the disclosure.

FIG. 6 is a flowchart illustrating a method for transmitting system information according to an embodiment of the disclosure. The method may be performed by a processor and a memory of a base station such as gNB. At step 602, a minimum SI message is transmitted. As described above, the minimum SI message may comprise information regarding transmission of at least one additional SI message. The minimum SI message may comprise an indicator for indicating the transmission of the at least one additional SI message, and the indicator may further indicate that the at least one additional SI message are periodically broadcasted.

At step 604, the at least one additional SI message is transmitted according to the information in the minimum SI message. The term "additional SI" refers to the "other SI" described above, and these two terms can be interchangeably used in the present disclosure.

Figure 7:
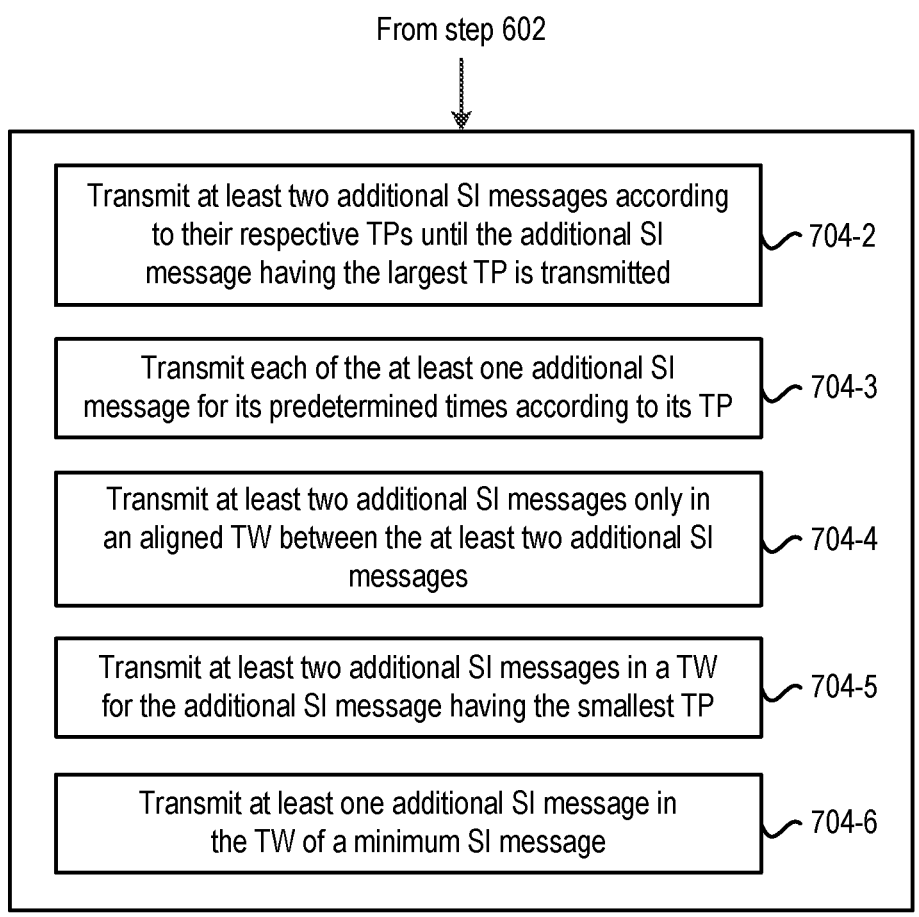
FIG. 7 is a flowchart for explaining the method of FIG. 6.

FIG. 7 is a flowchart for explaining the method of FIG. 6. At step 704-2, at least two additional SI messages are transmitted according to the respective TPs of the at least two additional SI messages until the additional SI message having the largest TP among the at least two additional SI messages is transmitted, such that the additional SI message having smaller TP is transmitted more than one times. This corresponds to the first scheme described above.

Alternatively, at step 704-3, each of the at least one additional SI message is transmitted for its predetermined times according to the TP of the each additional SI message. This corresponds to the second scheme described above. Alternatively, at step 704-4, at least two additional SI messages are transmitted only in an aligned TW between the at least two additional SI messages. This corresponds to the third scheme described above. Alternatively, at step 704-5, at least two additional SI messages are transmitted in a TW for the additional SI message having the smallest TP among the at least two additional SI messages. This corresponds to the fourth scheme described above. Alternatively, at step 704-6, the at least one additional SI message is transmitted in a TW of the minimum SI message. This corresponds to the fifth scheme described above. In the steps 704-2 to 704-6 described above, the indicator may be set in response to a request from a UE, as described in the ninth scheme described above.

Optionally, in the above examples, the indicator may indicate the transmission of the at least one additional SI message by a first indication mode or a second indication mode. The first indication mode indicates the transmission of the at least one additional SI message in its TW which is subsequent to the current TW of the minimum SI message. This corresponds to for example FIGS. 1A, 2A, 3A, 4A and 5A. The second indication mode indicates the transmission of the at least one additional SI message in its TW which is the same as the current TW of the minimum SI message. This corresponds to for example FIGS. 1B, 2B, 3B, 4B and 5B.

Figure 8:
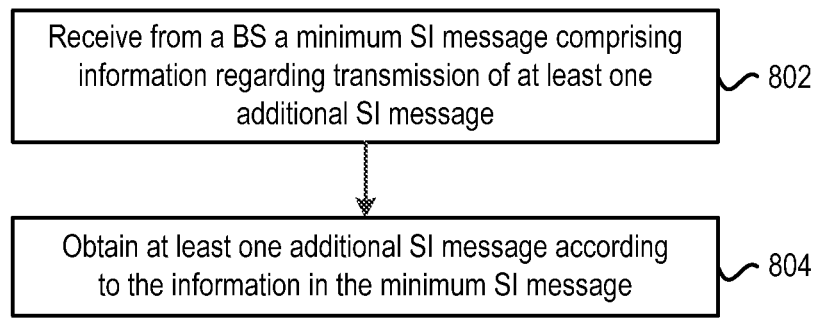
FIG. 8 is a flowchart illustrating a method for receiving system information according to an embodiment of the disclosure.

FIG. 8 is a flowchart illustrating a method for receiving system information according to an embodiment of the disclosure. The method may be performed by a processor and a memory of a user equipment. At step 802, a minimum SI message is received from a BS. This step may be similar to LTE. As described above, the minimum SI message may comprises information regarding transmission of at least one additional SI message. The minimum SI message may comprise an indicator for indicating the transmission of the at least one additional SI message, and the indicator may further indicate that the at least one additional SI message are periodically broadcasted. Then, at step 804, at least one additional SI message is obtained from the BS according to the information in the minimum SI message.

Figure 9:
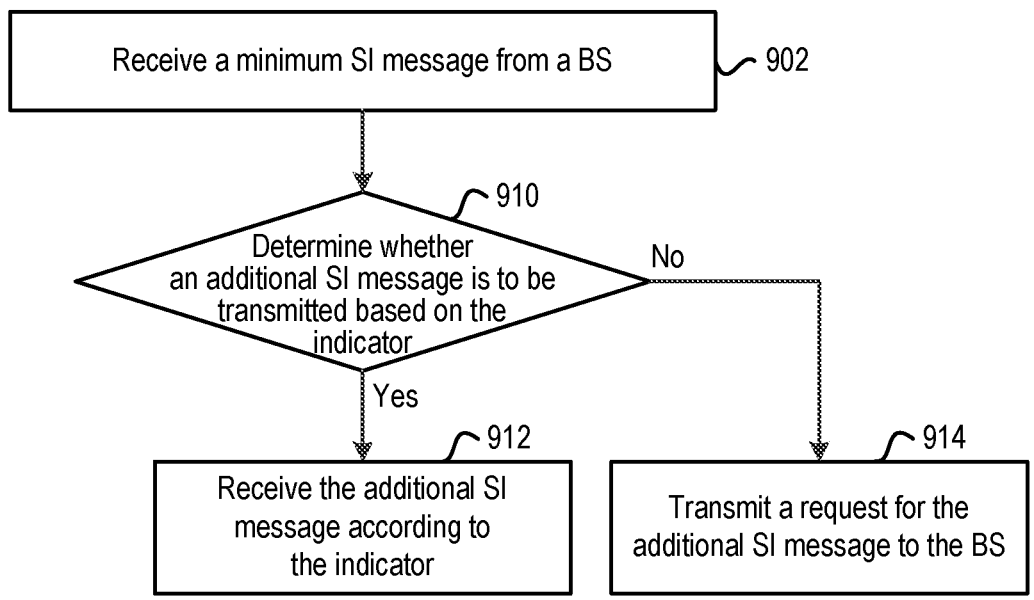
FIG. 9 is a flowchart for explaining the method of FIG. 8.

FIG. 9 is a flowchart for explaining the method of FIG. 8. At step 902, a minimum SI message is received from a BS. This step may be similar to step 802. Then, at step 910, it is determined, for an additional SI message in the at least one additional SI message, whether the additional SI message is to be transmitted based on the indicator. If the determination result at step 910 is positive, the additional SI message is received at step 912 according to the indicator. As one example, at least two additional SI messages are received only in an aligned TW between the at least two additional SI messages. This corresponds to the third scheme described above. As another example, at least two additional SI messages are received in a TW for the additional SI message having the smallest TP among the at least two additional SI messages. This corresponds to the fourth scheme described above. As still another example, at least one additional SI message is received in a TW of the minimum SI message. This corresponds to the fifth scheme described above.

On the other hand, if the determination result at step 910 is negative, a request for the additional SI message is transmitted to the BS at step 914. Then, steps 902, 910 and 912 may be repeated again. In this way, a new minimum SI message is received. It contains an indicator which indicates the transmission of the requested SI message. Then, the requested SI message can be received based on the indicator of the new minimum SI message.

Figure 10:
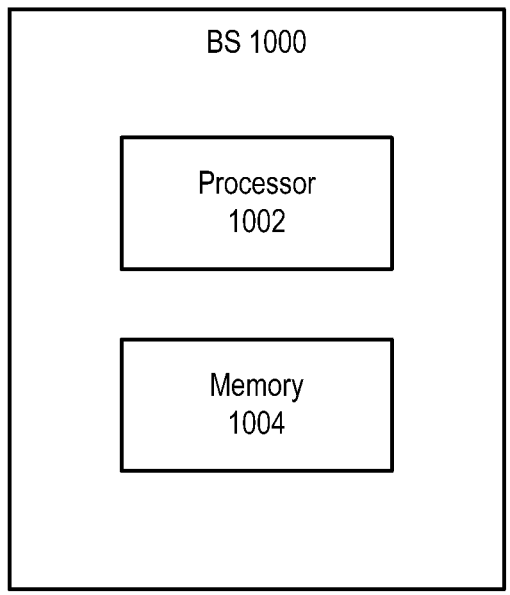
FIG. 10 is a block diagram illustrating a base station according to an embodiment of the disclosure.

FIG. 10 is a block diagram illustrating a base station according to an embodiment of the disclosure. As shown, the base station 1000 comprises a processor 1002 and a memory 1004. The memory 1004 contains instructions which may be executed by the processor 1002 to cause the base station 1000 to perform the method steps described above with reference to FIGS. 6, 7A and 7B. Besides, the other configurations of the base station 1000 may be well known to those skilled in the art, and thus the detailed description thereof is omitted here.

As another embodiment, a base station may comprise a minimum SI message transmission module and an additional SI message transmission module. The minimum SI transmission module is configured to transmit a minimum SI message. As described above, the minimum SI message may comprises information regarding transmission of at least one additional SI message. The minimum SI message may comprise an indicator for indicating the transmission of the at least one additional SI message, and the indicator may further indicate that the at least one additional SI message are periodically broadcasted. The additional SI message transmission module is configured to transmit at least one additional SI message according to the information in the minimum SI message.

Optionally, the minimum SI message transmission module may be configured to set the indicator in response to a request from a UE. Furthermore, optionally, the additional SI message transmission module may be configured to transmit at least two additional SI messages according to the respective TPs of the at least two additional SI messages until the additional SI message having the largest TP among the at least two additional SI messages is transmitted, such that the additional SI message having smaller TP is transmitted more than one times. As another example, the additional SI message transmission module may be configured to transmit each of the at least one additional SI message for its predetermined times according to the TP of the each additional SI message. As still another example, the additional SI message transmission module may be configured to transmit at least two additional SI messages only in an aligned TW between the at least two additional SI messages. As still another example, the additional SI message transmission module may be configured to transmit at least two additional SI messages in a TW for the additional SI message having the smallest TP among the at least two additional SI messages. As still another example, the additional SI message transmission module may be configured to transmit the at least one additional SI message in a TW of the minimum SI message.

Figure 11:
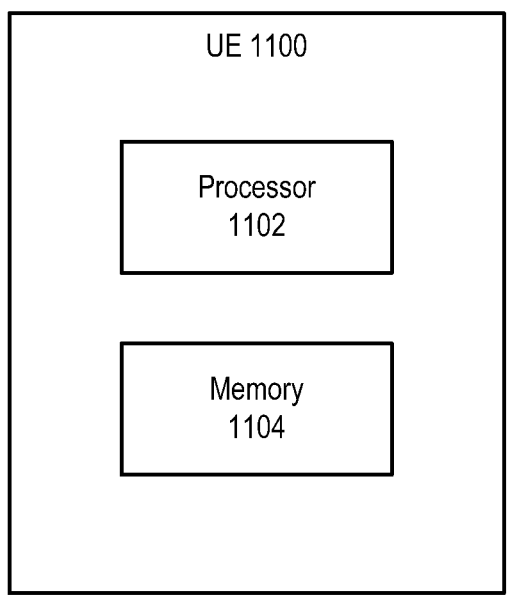
FIG. 11 is a block diagram illustrating a user equipment according to an embodiment of the disclosure.

FIG. 11 is a block diagram illustrating a user equipment according to an embodiment of the disclosure. As shown, the user equipment 1100 comprises a processor 1102 and a memory 1104. The memory 1104 contains instructions which may be executed by the processor 1102 to cause the user equipment 1100 to perform the method steps described above with reference to FIGS. 8, 9A and 9B. Besides, the other configurations of the user equipment 1100 may be well known to those skilled in the art, and thus the detailed description thereof is omitted here.

As another embodiment, a user equipment may comprise a reception module and an obtaining module. The reception module is configured to receive a minimum SI message from a BS. As described above, the minimum SI message may comprises information regarding transmission of at least one additional SI message. The minimum SI message may comprise an indicator for indicating the transmission of the at least one additional SI message, and the indicator may further indicate that the at least one additional SI message are periodically broadcasted. The obtaining module is configured to obtain at least one additional SI message from the BS according to the information in the minimum SI message.

Optionally, the obtaining module may be configured to obtain at least one additional SI message by: determining, for an additional SI message in the at least one additional SI message, whether the additional SI message is to be transmitted based on the indicator; in response to a positive determination result, receiving the additional SI message according to the indicator; and in response to a negative determination result, transmitting a request for the additional SI message to the BS.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for transmitting system information (SI), comprising:

transmitting a minimum SI message, as defined in a 5G radio system of a Third Generation Partnership Project (3GPP), in a transmission window (TW), wherein the minimum SI message comprises an indicator regarding transmission of at least two additional SI messages and wherein the indicator is transmitted in the TW of the minimum SI message; and transmitting the at least two additional SI messages according to the indicator provided in the TW of the minimum SI message, wherein a transmission period (TP) of each of the at least two additional SI messages has a periodicity that is an integer multiple of a TP of the minimum SI message and wherein a mode of transmission for transmitting the SI does not allow transmission of the at least two additional SI messages in the TW of the minimum SI message, but instead the transmission of the at least two additional SI messages is in a TW of the at least two additional SI messages having a smallest TP among TPs of the at least two additional SI messages.

2. The method according to claim 1, wherein each TP of the at least two additional SI messages has a periodicity that is a power-of-two multiple of the TP of the minimum SI message.

3. The method according to claim 1, wherein the indicator is set in response to a request from a user equipment (UE); and transmitting the at least two additional SI messages until the additional SI message having the largest TP among the at least two additional SI messages is transmitted.

4. The method according to claim 3, wherein a redundancy version for a repeated SI message transmission is adjusted.

5. The method according to claim 1, wherein the indicator is set in response to a request from a user equipment (UE); and transmitting each of the at least two additional SI messages for predetermined times.

6. The method according to claim 5, wherein a number of repetitions for each of the at least two additional SI messages is determined based on one or more of:
a coverage size of a cell;
a received signal strength of the request from the UE; and
an importance of a requested SI message.

7. The method according to claim 1, wherein the indicator is set in response to a request from a user equipment (UE).

8. The method according to claim 1, wherein the indicator is set to ON until the transmission of the at least two additional SI messages is finished; or wherein the indicator is set to ON only before the transmission of the at least two additional SI messages.

9. The method according to claim 1, wherein the indicator indicates the transmission of the at least two additional SI messages as a whole; or wherein the indicator indicates the transmission for each of the at least two additional SI messages.

10. The method according to claim 1, wherein the minimum SI message indicates whether a user equipment (UE) is allowed to send an SI request.

11. The method according to claim 10, wherein the indicator in the minimum SI message has a predetermined value for informing the UE not to send an SI request.

12. A method for receiving system information (SI), comprising:
receiving a minimum SI message in a transmission window (TW) from a base station (BS), the minimum SI message as defined in a 5G radio system of a Third Generation Partnership Project (3GPP), wherein the minimum SI message comprises an indicator regarding transmission of at least two additional SI messages and wherein the indicator is transmitted in the TW of the minimum SI message; and
obtaining the at least two additional SI messages transmitted from the BS according to the indicator provided in the TW of the minimum SI message, wherein a transmission period (TP) of each of the at least two additional SI messages has a periodicity that is an integer multiple of a TP of the minimum SI message and wherein a mode of transmission for transmitting the SI does not allow transmission of the at least two additional SI messages in the TW of the minimum SI message from the BS, but instead the transmission of the at least two additional SI messages is in a TW of the at least two additional SI messages having a smallest TP among TPs of the at least two additional SI messages.

13. The method according to claim 12, wherein each TP of the at least two additional SI messages has a periodicity that is a power-of-two multiple of the TP of the minimum SI message.

14. The method according to claim 12, wherein the obtaining the at least two additional SI messages comprises:
for an additional SI message in the at least two additional SI messages, determining whether the additional SI message is to be transmitted based on the indicator;
in response to a positive determination result, receiving the additional SI message of the at least two additional messages according to the indicator; and
in response to a negative determination result, transmitting a request for the additional SI message of the at least two additional messages to the BS.

15. The method according to claim 12, wherein the indicator indicates the transmission of the at least two additional SI messages as a whole; or wherein the indicator indicates the transmission for each of the at least two additional SI messages.

16. The method according to claim 12, wherein the minimum SI message indicates whether a user equipment (UE) is allowed to send an SI request.

17. The method according to claim 16, wherein the indicator in the minimum SI message has a predetermined value for informing the UE not to send an SI request.

18. A user equipment (UE) capable of receiving system information (SI), comprising:
a processor; and
a memory containing instructions which, when executed by the processor, cause the UE to perform operations to:
receive a minimum SI message from a base station (BS), the minimum SI message, as defined in a 5G radio system of a Third Generation Partnership Project (3GPP), a transmission window (TW), wherein the minimum SI message comprises an indicator regarding transmission of at least two additional SI messages and wherein the indicator is transmitted in the TW of the minimum SI message; and
obtain the at least two additional SI messages from the BS according to the indicator provided in the TW of the minimum SI message, wherein a transmission period (TP) of each of the at least two additional SI messages has a periodicity that is an integer multiple of a TP of the minimum SI message and wherein a mode of transmission for transmitting the SI does not allow transmission of the at least two additional SI messages in the TW of the minimum SI message, but instead the transmission of the at least two additional SI messages is in a TW of the at least two additional SI messages having a smallest TP among TPs of the at least two additional SI messages.

* * * * *

UNITED STATES PATENT AND TRADEMARK OFFICE
CERTIFICATE OF CORRECTION

PATENT NO. : 10,912,011 B2
APPLICATION NO. : 15/568436
DATED : February 2, 2021
INVENTOR(S) : Liu et al.

Page 1 of 1

It is certified that error appears in the above-identified patent and that said Letters Patent is hereby corrected as shown below:

In the Specification

In Column 9, Line 26, delete "according its TP." and insert -- according to its TP. --, therefor.

In Column 9, Lines 37-38, delete "according its TP." and insert -- according to its TP. --, therefor.

In Column 10, Line 28, delete "indictor" and insert -- indicator --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*